US010691272B2

(12) United States Patent
Li

(10) Patent No.: US 10,691,272 B2
(45) Date of Patent: Jun. 23, 2020

(54) TOUCH CONTROL STRUCTURE AND MANUFACTURING METHOD THEREOF, TOUCH CONTROL PANEL AND DISPLAY DEVICE

(71) Applicant: BOE TECHNOLOGY GROUP CO., LTD., Beijing (CN)

(72) Inventor: Wang Li, Beijing (CN)

(73) Assignee: BOE TECHNOLOGY GROUP., LTD., Beijing (CN)

( * ) Notice: Subject to any disclaimer, the term of this patent is extended or adjusted under 35 U.S.C. 154(b) by 0 days.

(21) Appl. No.: 16/193,904

(22) Filed: Nov. 16, 2018

(65) Prior Publication Data

US 2019/0302920 A1    Oct. 3, 2019

(30) Foreign Application Priority Data

Mar. 28, 2018 (CN) .......................... 2018 1 0266139

(51) Int. Cl.
*G06F 3/044* (2006.01)
(52) U.S. Cl.
CPC .... *G06F 3/044* (2013.01); *G06F 2203/04102* (2013.01); *G06F 2203/04103* (2013.01)
(58) Field of Classification Search
None
See application file for complete search history.

(56) References Cited

U.S. PATENT DOCUMENTS

| | | | |
|---|---|---|---|
| 2015/0042598 A1* | 2/2015 | Chae ................ | G06F 3/041 345/174 |
| 2016/0117002 A1* | 4/2016 | Lee ................... | G06F 3/044 345/173 |
| 2018/0253175 A1* | 9/2018 | Yao ................... | G06F 3/0412 |
| 2019/0243486 A1* | 8/2019 | Zhang .............. | G06F 3/041 |

* cited by examiner

*Primary Examiner* — Duane N Taylor, Jr.
(74) *Attorney, Agent, or Firm* — Foley & Lardner LLP

(57) ABSTRACT

The present disclosure provides a touch control structure. The touch control structure includes a first electrode distributed along the first direction and a second electrode distributed along the second direction. The first direction is intersecting with the second direction. The first electrode includes a first sub-electrode which is interval distributed along the second direction and electrically connected. The second electrode includes a second sub-electrode which is interval arrange along the first direction and electrically connected. Each of the first sub electrodes and each of the second sub electrodes all include a plurality of combined parts interval distributed along the first direction, and the adjacent combined parts are connected through the stress relief part. When the touch control structure is bent in the first direction, the stress relief part has a predetermined twist length in the second direction.

15 Claims, 5 Drawing Sheets

TOUCH CONTROL STRUCTURE AND MANUFACTURING METHOD THEREOF, TOUCH CONTROL PANEL AND DISPLAY DEVICE

CROSS REFERENCE

This application is based upon and claims priority to Chinese Patent Application No. 201810266139.9, filed on Mar. 28, 2018, the entire contents thereof are incorporated herein by reference.

TECHNICAL FIELD

The present disclosure relates to the field of display device technology, and particularly to a touch control structure and manufacturing method thereof, a touch control panel and a display device.

BACKGROUND

The flexible touch control display device is widely used in mobile phones, tablet computers, because of its characteristics of being bendable and convenient to carry. However, the flexible touch control display device has a certain bending limit, and the flexible touch control display device is easily damaged when the flexible touch control display device exceeds its bending limit. Therefore, with the development of flexible touch control device technology, the development of the bending ability of the flexible touch control device has become a very important technical parameter.

In the related technology, the flexible touch control display device generally adopts a capacitive touch control operation principle, and the touch control panel must be configured on the side close to the protective plate, the touch control panel is subjected to a large stress when the flexible touch control display device is bent.

However, the touch control panel generally uses such as ITO (indium tin oxide), metal, inorganic insulating layer and so on, as the touch control structure, and the bending tolerance of these materials is weak, when the flexible touch control display device has a smaller bending radius, that the bending ability is weak, it is easy to cause the touch control panel to be damaged and functional failure.

It should be understood that, the information disclosed in the background part above is not only provided to facilitate understanding of the background of the present disclosure, and may include information which doesn't constitute existing technology well-known for those ordinary skilled in the art.

SUMMARY

According to an aspect of the present disclosure, a touch control structure is provided. The touch control structure includes a first electrode distributed along a first direction and a second electrode distributed along a second direction. The first direction intersects with the second direction. The first electrode includes first sub-electrodes distributed along the second direction with intervals and electrically connected, and the first sub-electrodes are located at non-overlapping parts of the first electrode and the second electrode. The second electrode includes second-sub electrodes distributed along the first direction with intervals and electrically connected, and the second sub-electrodes are located at non-overlapping parts of the first electrode and the second electrode.

Each of the first sub-electrodes and each of the second sub-electrodes respectively includes a plurality of combined parts distributed along the first direction with intervals. Adjacent ones of the plurality of combined parts are connected with each other by stress relief parts. When the touch control structure is bent in the first direction, the stress relief parts has are twisted with a predetermined twist length in the second direction.

According to an aspect of the present disclosure, a method for manufacturing a touch control structure is provided. The method includes forming a first electrode distributed in parallel to the first direction. The first electrode includes the first sub-electrodes distributed along the second direction with intervals and electrically connected. The method includes forming the second electrode distributed in parallel to the second direction. The second electrode includes the second sub-electrodes distributed along the first direction with intervals and electrically connected. The first sub-electrodes and the second sub-electrodes are divided into a plurality of combined parts along the first direction. A stress relief part is disposed between adjacent combined parts, and the adjacent ones of the plurality of combined parts are connected with the stress relief part. When the touch control structure is bent in the first direction, the stress relief parts are twisted with predetermined twist length in the second direction.

According to an aspect of the present disclosure, a touch control panel is provided. The touch control panel includes a display area which includes a bending area. The touch control structure as described above is provided on the bending area.

According to an aspect of the present disclosure, a touch control panel is provided. The touch control structure as described above is provided in the display area.

According to an aspect of the present disclosure, a display device including the touch control panel as described above is provided.

BRIEF DESCRIPTION OF THE DRAWINGS

Herein the drawings that are incorporated into the description and constitute a part of the present description illustrate arrangements in accordance with the present disclosure, and are used for explaining principle(s) of the present disclosure together with the description. It should be understood that the following drawings merely illustrate some arrangements of the present disclosure, from which other alternatives can be derived without any creative works for those ordinary skilled in the art.

DETAILED DESCRIPTION

Figure 1:
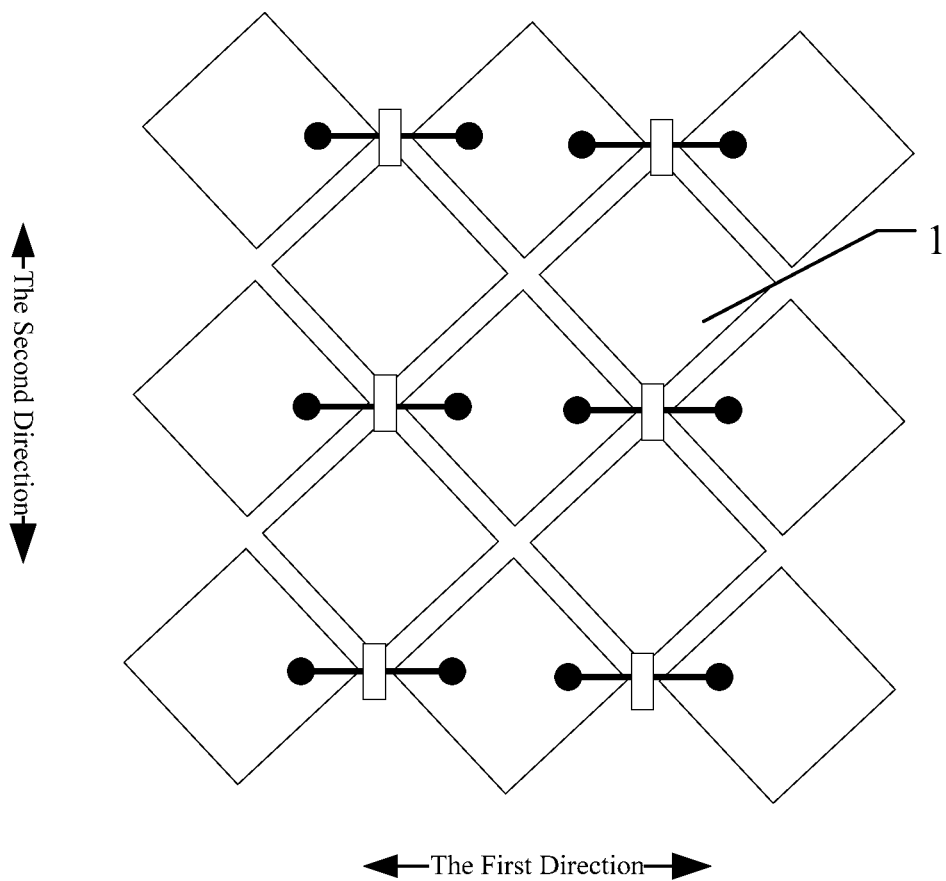
FIG. 1 is a schematic diagram illustrating a structure of a touch control structure in related art.

In order to make objects, technical solutions and advantages of the arrangements of the present disclosure apparent, the technical solutions of the arrangements will be described in a clearly and fully understandable way in connection with the drawings related to the arrangements of the disclosure. Apparently, the described arrangements are just a part but not all of the arrangements of the present disclosure. Based on the described arrangements herein, those skilled in the art can obtain other arrangement(s), without any inventive work, which should be within the scope of the present disclosure. The same reference numbers in the drawings denote the same or similar parts, and thus will be omitted.

Although the relative terms such as "upper" and "lower" are used in the instructions to describe the relative relationship of one component of the icon to another component, however, these terms are used in this instruction for convenience only, for example, the direction of one example is described according to the drawing. It should be understood that if the device as shown is flipped and turned upside and down, the component described "upper" will become the component "below". Other relative terms, such as "high", "low", "top", "bottom", "left", "right", etc., also have similar meanings. When a structure is "above" another structure, it may indicate that a structure is integrally formed on another structure, or that a structure is "directly" configured on another structure, or that a structure is "indirectly" configured on other structure through another structure.

The terms "a", "an", "the" are used to express the presence of one or more elements/part etc., the terms "include" and "provide" are used to express the meaning of the open inclusive, and also include additional elements/component/etc., in addition to the listed elements/component/etc.

In the related art, as shown in FIG. 1, which is the schematic diagram illustrating of a structure of a touch control structure in related art, the touch control structure includes a first electrode distributed along a first direction, a second electrode distributed along a second direction, and the first direction is intersecting with the second direction; the first electrode includes first sub-electrodes 1 distributed along the second direction with intervals and electrically connected, and the first sub-electrodes are located at non-overlapping parts of the first electrode and the second electrode; the second electrode includes a plurality of second-sub electrodes 2 distributed along the first direction with intervals and electrically connected; and the second sub-electrodes are located at non-overlapping parts of the first electrode and the second electrode. The first sub-electrodes 1 and the second sub-electrodes 2 are all rhombus-shaped, and the first direction and the second direction are distributed along the direction parallel to a diagonal direction of the first sub-electrodes 1 and the second sub-electrodes 2, respectively. Mutual capacitance structures are formed with the first sub-electrodes 1 and the second sub-electrodes 2 form, when a finger or other touching tool acts on a certain position, the values of capacitance between the first sub-electrodes 1 and the second sub-electrodes 2 will change, realizing to operation the touch control. Wherein, the first sub-electrodes land the second sub-electrodes 2 are usually composed of ITO (indium tin oxide) materials, of which the bending resistance is weak. When the touch control structure bends along the first direction, the first sub-electrodes 1 and the second sub-electrodes 2 are easily damaged, thus destroying the touch control structure.

Figure 2:
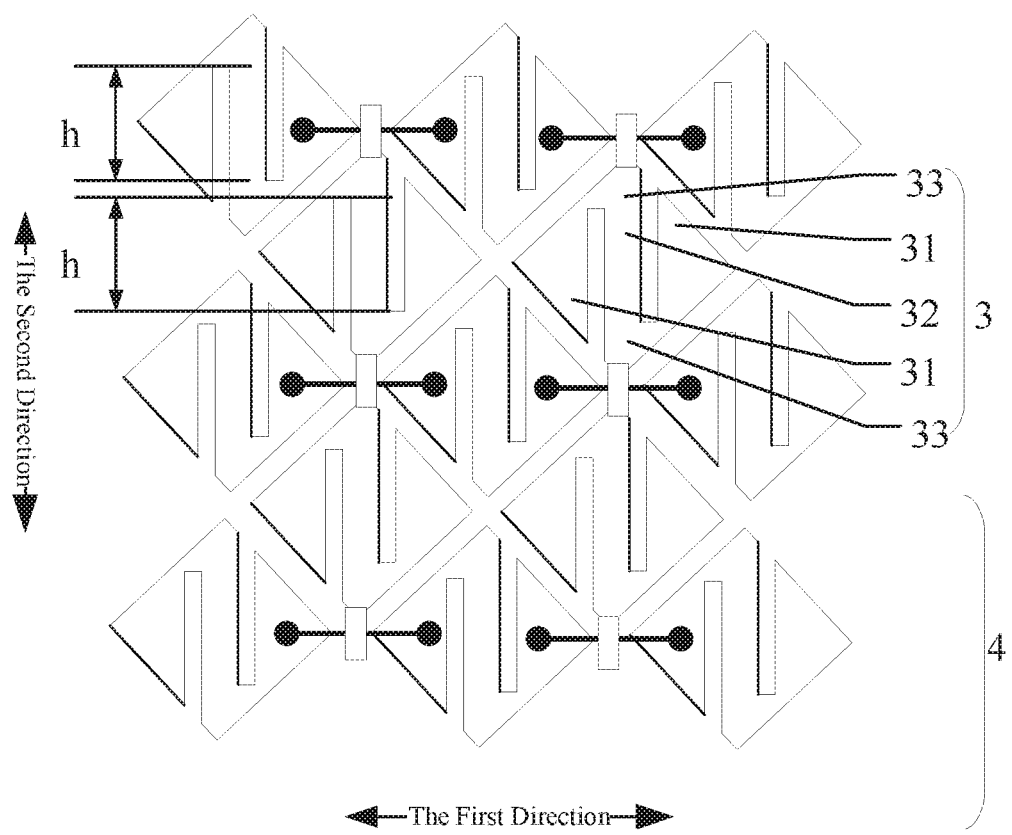
FIG. 2 is a schematic diagram illustrating a structure of the touch control structure in an illustrative arrangement of the present disclosure.

Based on the above, the exemplary arrangement provides a touch control structure, as shown in FIG. 2, which is a schematic diagram illustrating a structure of the touch control structure in an illustrative arrangement of the present disclosure. The touch control structure comprises a first electrode distributed along a first direction, a second electrode distributed along a second direction, and the first direction is intersecting with the second direction. The first electrode includes first sub-electrodes 3 distributed along the second direction with intervals, and the first sub-electrodes are located at a part of the first electrode that is not overlapped with the second electrode. The second electrode includes second sub-electrodes 4 distributed along the first direction with intervals, and the second sub-electrodes are located at a part of the second electrode that is not overlapped with the first electrode. Each of the first sub-electrodes 3 includes two combined parts 31 distributed along the first direction with intervals; each of the second sub-electrodes 4 includes two combined parts 41 distributed along the second direction with intervals, the two combined parts 31 are connected by stress relief parts 32, the two combined parts 41 are connected by stress relief parts 42. When the touch control structure is bent in the first direction, the stress relief parts 32, 42 are twisted with a predetermined twist length h in the second direction.

The exemplary arrangement provides a touch control structure and a manufacturing method, a touch control panel and a display device. The sub-electrodes of touch control structure are divided into a plurality of combined parts in the bending direction, adjacent combined parts are connected by stress relief parts, and the stress relief parts are twisted with a predetermined twist length in the direction perpendicular to the bending direction. On the one hand, when the touch control structure is bent, the stress relief parts are twisted, so that the bending ability of the touch control structure can be improved. On the other hand, the touch control structure has a simple structure and low cost.

It should be noted that, in the exemplary arrangement, the first sub-electrodes 3 and the second sub-electrodes 4 may be formed rhombus-shaped, and the first direction and the second direction are parallel to a diagonal direction of the first sub-electrodes 3 and the second sub-electrodes 4, respectively. It should be understood that in other exemplary arrangements, the first sub-electrodes and the second sub-electrodes have more shapes to choose, such as a triangle, etc., which are all within the scope of the present disclosure.

In the present exemplary arrangement, as shown in FIG. 2, the stress relief parts 32, 42 may be formed in such a manner that the combined parts 31 and the stress relief parts 32 are connected by joint parts 33, and the combined parts 41 and the relief parts 42 are connected by joint parts 43. Two adjacent joint parts 33 have predetermined distance h in the second direction, and two adjacent joint parts 43 have predetermined distance h in the second direction. Thus, when the touch control structure is bent in the first direction, the stress relief parts 32, 42 are twisted with a predetermined twist length h in the second direction. Wherein, the staggered distance of the adjacent joint parts in the second direction is the twisting length of the stress relief parts.

Figure 3:
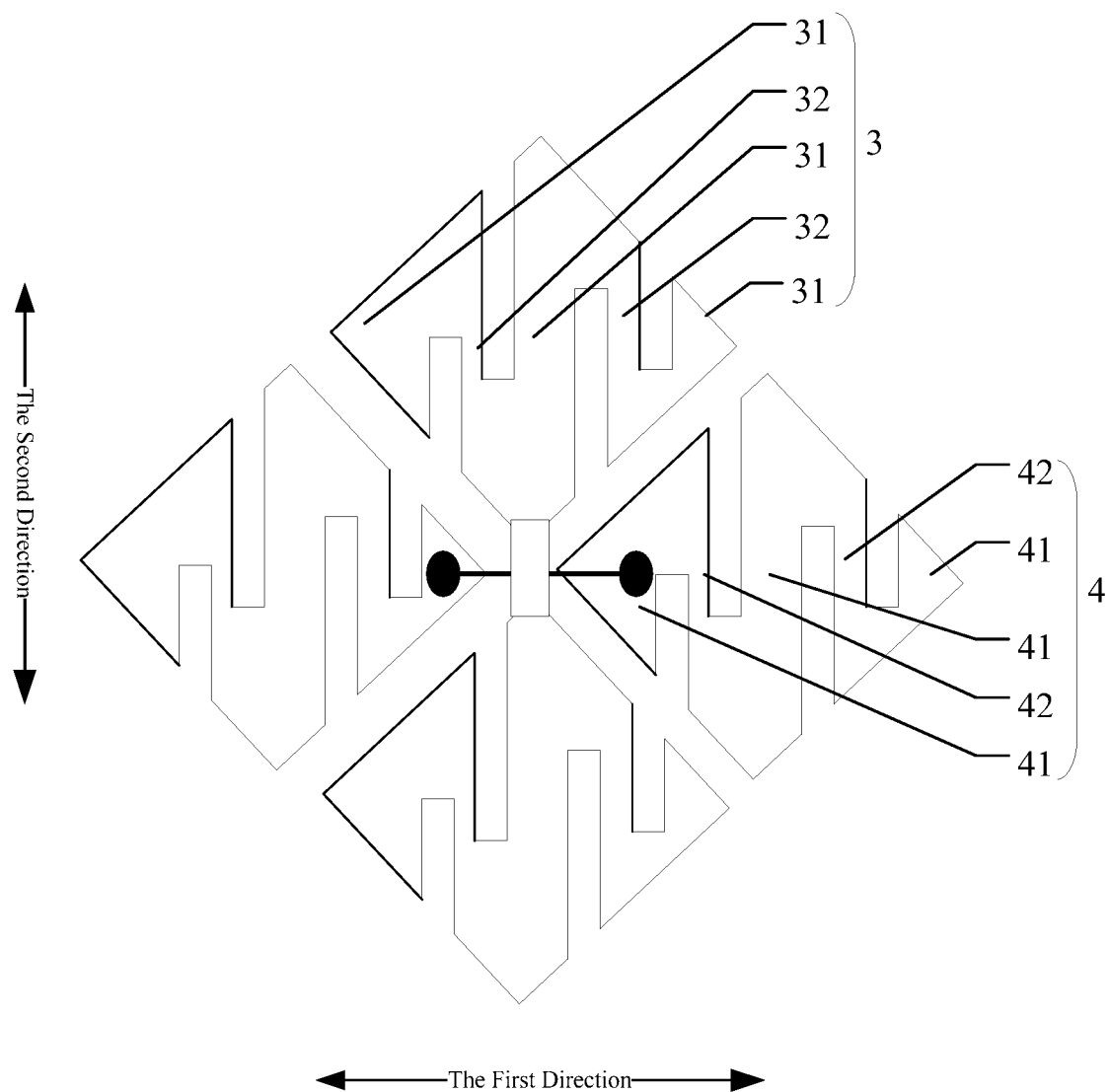
FIG. 3 is a schematic diagram illustrating a structure of the touch control structure in another illustrative arrangement of the present disclosure

In the exemplary arrangement, in order to further improve the bending ability of the touch control structure, the first sub-electrodes 3 and the second sub-electrodes 4 may further include a plurality of stress relief parts, as shown in FIG. 3, which is a schematic diagram illustrating a structure of the touch control structure in another illustrative arrangement of the present disclosure. Wherein, the first sub-electrodes 3 include three combined parts 31, and the adjacent combined parts 31 are connected by stress relief parts 32. The second sub-electrodes 4 include three combined parts 41, and the adjacent combined parts 41 are connected by stress relief par 42. In the exemplary arrangement, the first sub-electrodes 3 include two stress relief parts 32, and the second sub-electrodes 4 include two stress relief parts 42, the two stress relief parts cooperate to further improve the bending ability of the touch control structure. It should be understood that, in other exemplary arrangements, the first sub-electrodes 3 and the second sub-electrodes 4 may also include other quantities of the stress relief parts, which are all within the scope of the present disclosure.

The longer the twist length of the stress relief parts is, the greater the twist angle of the stress relief parts is as the touch control structure bending, and the stronger the bending capability of the touch structure is. In the exemplary arrangement, the joint parts of the stress relief parts and the combined parts may be located outside the first sub-electrodes and the second sub-electrodes, so as to maximize the improvement of the twist length of the stress relief parts.

In the present exemplary arrangement, when the touch control structure is bent in the first direction, the combined parts 31, 41 have the predetermined length in the second direction. For example, as shown in FIG. 3, the joint parts of the combined parts located at the intermediate part of the sub-electrodes and two adjacent stress relief parts are alternative distributed in the second direction, such that when the touch control structure is bent in the first direction, the combined parts located at the intermediate parts of the sub-electrodes are twisted with a predetermined twist length in the second direction, thus further improving the bending ability of the touch structure.

In the present exemplary arrangement, the length direction of the relief parts 32, 42 and the combined parts 31, 41 is parallel to the second direction. This arrangement can ensure the effective twist length of the relief parts 32, 42 and the combined parts 31, 41 in the second direction is maximized, thus improving the bending ability of the touch control structure. In other exemplary arrangement, the length direction of the relief parts 32, 42 and the combined parts 31, 41 may also be in other directions, which are all within the scope of protection of the present disclosure.

Figure 4:
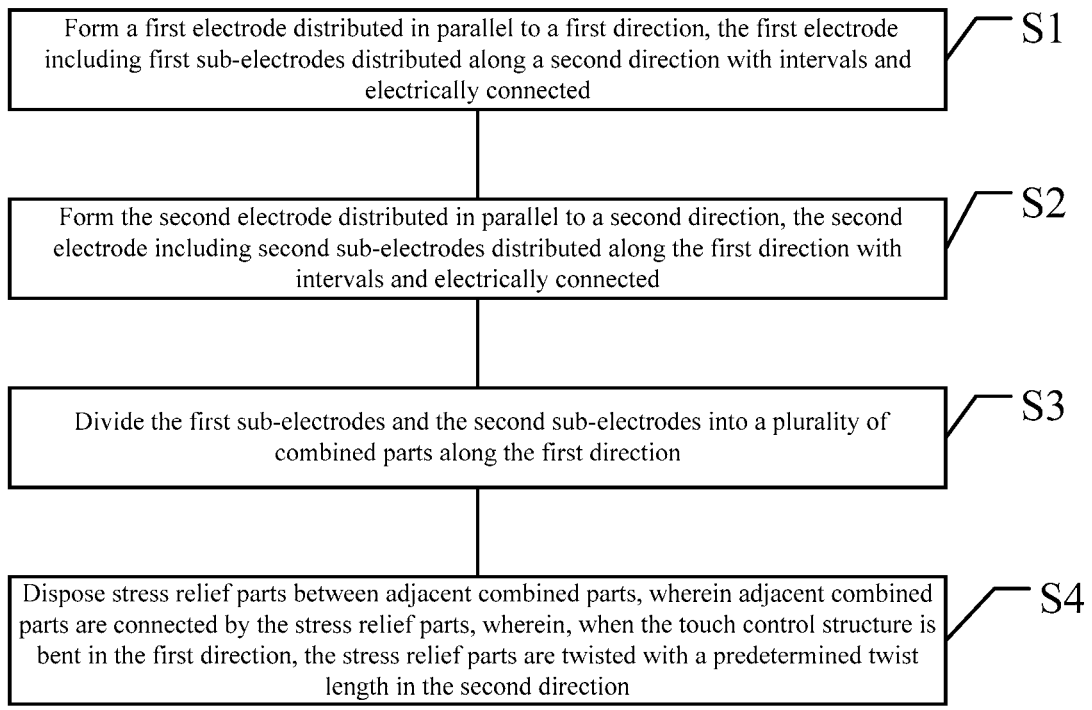
FIG. 4 is a schematic diagram illustrating a flowchart of a fabrication method of the touch control structure in an illustrative arrangement of the present disclosure.

The present exemplary arrangement further provides a method for manufacturing the touch control structure, the touch control structure includes a first electrode that is distributed parallel to a first direction, a second electrode that is distributed parallel to a second direction, and the first direction is intersecting with the second direction; the first electrode includes first sub-electrodes distributed along the second direction with intervals and connected, and the first sub-electrodes are located at the non-overlapping parts of the first electrode and the second electrode; the second electrode includes second-sub electrodes distributed along the first direction with intervals and connected; and the second sub-electrodes are located at the non-overlapping parts of the first electrode and the second electrode; as shown in the FIG. 4, which is a schematic diagram illustrating a flowchart of a manufacturing method of the touch control structure in an illustrative arrangement of the present disclosure. This method comprises the following blocks.

In block S1, the first electrode distributed in parallel to the first direction is formed. The first electrode includes first sub-electrodes distributed along the second direction with intervals and electrically connected.

In block S2, the second electrode distributed parallel to the second direction is formed. The second electrode includes second sub-electrodes distributed along the first direction with intervals and electrically connected.

In block S3, the first sub-electrodes and the second sub-electrodes are divided into a plurality of combined parts along the first direction.

In block S4, the stress relief parts are disposed between the adjacent combined parts, and adjacent combined parts are connected by the stress relief part.

When the touch control structure is bent in the first direction, the stress relief parts are twisted with a predetermined twist length in the second direction.

The blocks S3 and S4 in the present exemplary arrangement may be completed in one process. For example, the combined parts and the stress relief parts may be integrally formed by one patterning process technique, or may be formed by an etching technique, and at least one notch is etched at a rhombic electrode so as to form the combined parts and the stress relief parts. Here, the one patterning process indicates using one mask through one exposure. As shown in FIG. 2, each of the sub-electrodes includes two notches. As shown in FIG. 3, each of the sub-electrodes includes four notches. It should be understood that the number of notches of the first sub-electrodes and the second sub-electrodes may be different, and the above exemplary arrangements are merely illustrative, and the number of the notches of the present disclosure may be any number, and those skilled in the art may design according to actual needs. The above method has simple technique and convenient operation.

Alternatively, each of the rhombus-shaped sub-electrodes may be in a central symmetrical pattern.

The method for fabrication the touch control structure provided by the present exemplary arrangement has the same technical features and working principles with the above-mentioned touch control structure and the content have been described in detail, herein the details are not described again.

Figure 5:
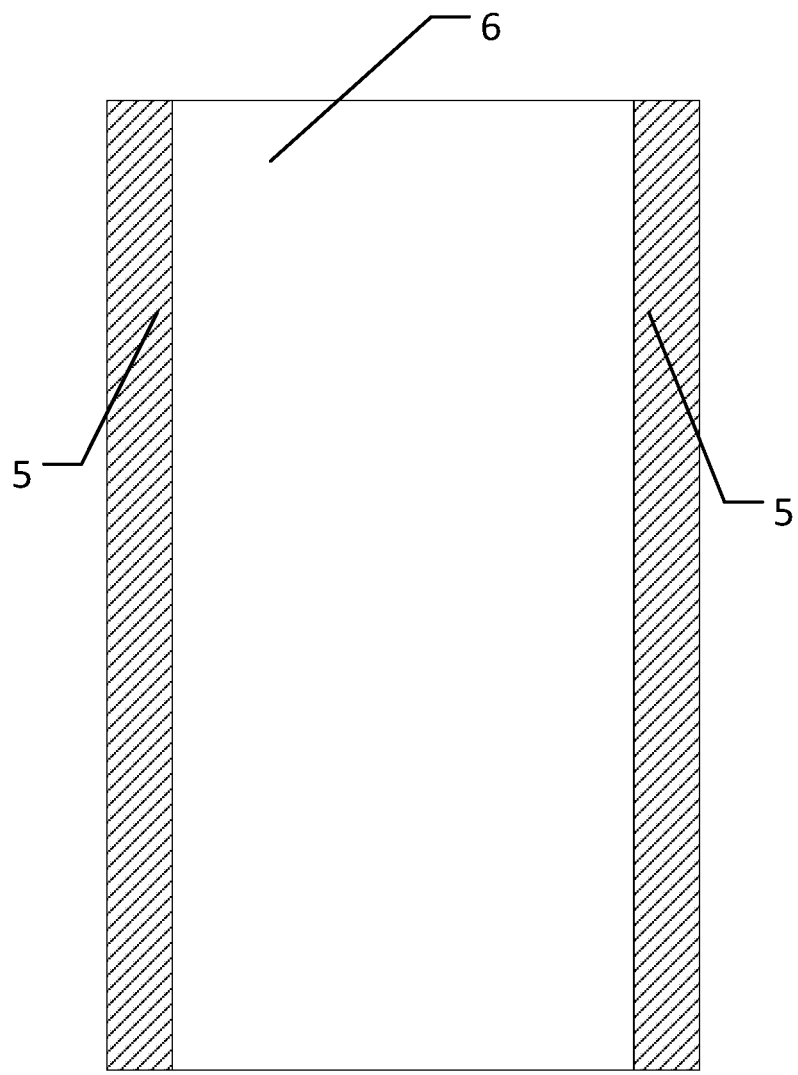
FIG. 5 is a schematic diagram illustrating a structure of a touch control panel in an illustrative arrangement of the present disclosure.

The present exemplary arrangement further provides a touch panel, as shown in FIG. 5, which is a schematic diagram illustrating a structure of a touch control panel in an illustrative arrangement of the present disclosure. The touch control panel may include a display area 6, and the display area 6 may include a bending area 5, and the touch control structure may be provided on the bending area 5. When the touch control structure is bent, the edge located on the display area 6 is easily damaged due to an excessive bending angle. Therefore, in the present exemplary arrangements, the bending area 5 may be provided at an edge of the display area. In other exemplary arrangement, the bending area 5 may also be provided at different positions of the display area according to actual needs. In addition, the display area 6 may also be provided with the above touch control structure, thus further increasing the overall bending ability or the touch control panel.

The touch control panel provided by the present exemplary arrangement has the same technical features and working principles as the above-mentioned touch control structure, and the above content has been described in detail, herein the details are not described again.

The present exemplary arrangement further provides a display device including the above touch control panel.

The display device provided by the present exemplary arrangement has the same technical features and working principles as the above-mentioned touch control panel, and the above content has been described in detail, herein the details are not described again.

By considering the specification and upon implementing the disclosure herein, those skilled in the art can easily conceive of other arrangements of the present disclosure.

The present disclosure is intended to cover all variations, purposes or adaptive modifications of the present disclosure, which should be in accordance with the general principle of the present disclosure and should encompass common knowledge or conventional technical means not disclosed in the present disclosure. The description and the arrangements are merely deemed as illustrative, and the true scope and spirit of the present disclosure are indicated by the appended claims.

The features, structures, or characteristics described above may be combined in any suitable manner in one or more arrangements, and if possible, the features discussed in the various arrangements are interchangeable. In the above description, numerous specific details are provided so as to show a full understanding of the implementation of the present disclosure. However, those skilled in the art appreciate that the technical implementation of the present disclosure may be practiced without one or more of the specific details, or other methods, components, materials may be used. In other instances, well-known structures, materials or operations are not shown or described in detail to avoid obscuring aspects of the present disclosure.

What is claimed is:

1. A touch control structure, comprising:
   a first electrode distributed along a first direction, and
   a second electrode distributed along a second direction, the first direction intersecting with the second direction,
   wherein the first electrode includes a plurality of first sub-electrodes distributed along the second direction with intervals and electrically connected, and wherein the second electrode includes a plurality of second sub-electrodes distributed along the first direction with intervals and electrically connected,
   wherein each of the first sub-electrodes and each of the second sub-electrodes respectively include a plurality of combined parts distributed along the first direction with intervals, and adjacent ones of the plurality of combined parts are connected with each other by stress relief parts,
   and wherein the touch control structure is bent in the first direction, the stress relief parts have a predetermined twist length in the second direction.

2. The touch control structure according to claim 1, wherein
   the plurality of combined parts and the stress relief parts are connected by joint parts, and wherein a predetermined distance, between an adjacent one of the joint parts in the second direction, is equal to the predetermined twist length.

3. The touch control structure according to claim 2, wherein
   the joint parts between the stress relief parts and the plurality of combined parts are provided in outer sides of the first sub-electrode or the second sub-electrode.

4. The touch control structure according to claim 1, wherein
   when the touch control structure is bent in the first direction, at least a portion of the plurality of combined parts is twisted with the predetermined twist length in the second direction.

5. The touch control structure according to claim 4, wherein
longitudinal directions of the stress relief parts and the plurality of combined parts are parallel to the second direction.

6. The touch control structure according to claim 1, wherein
   the plurality of first sub-electrodes and the plurality of second sub-electrodes are all rhombus-shaped, and the first direction and the second direction are parallel to diagonal directions of the first plurality of sub-electrodes and the second plurality of sub-electrodes, respectively.

7. The touch control structure according to claim 6, wherein
   the plurality of first sub-electrodes and the plurality of second sub-electrodes are formed in central symmetrical patterns.

8. A method for manufacturing a touch control structure, comprising:
   forming a first electrode distributed in parallel to a first direction, the first electrode including first sub-electrodes distributed along a second direction with intervals and electrically connected;
   forming the second electrode distributed in parallel to a second direction, the second electrode including second sub-electrodes distributed along the first direction with intervals and electrically connected;
   dividing the first sub-electrodes and the second sub-electrodes into a plurality of combined parts along the first direction;
   disposing stress relief parts between adjacent ones of the plurality of combined parts, wherein the adjacent ones of the plurality of combined parts are connected by the stress relief parts;
   wherein when the touch control structure is bent in the first direction, the stress relief parts are twisted with a predetermined twist length in the second direction.

9. The method according to claim 8, wherein
forming the plurality of combined parts and the stress relief parts of the first sub-electrodes and the second sub-electrodes through one patterning process.

10. The method according to claim 8, wherein
etching at least one notch on the first sub-electrodes and the second sub-electrodes to form the plurality of combined parts and the stress relief parts.

11. The method according to claim 10, wherein
the first sub-electrodes and the second sub-electrodes are formed in central symmetrical patterns respectively.

12. A touch control panel comprising a display area, wherein
   the display area includes a bending area, and the touch control structure according to claim 1 is provided on the bending area.

13. The touch control panel according to claim 12, wherein, the touch control structure according to claim 1 is provided in the display area.

14. A display device, comprising the touch control panel according to claim 12.

15. A display device, comprising the touch control panel according to claim 13.

* * * * *